United States Patent Office 2,845,353
Patented July 29, 1958

2,845,353
LIQUID SWEETENING COMPOSITION AND METHOD OF PREPARING THE SAME

Charles Rifkin, Highland Park, and Gilman N. Cyr, New Brunswick, N. J., assignors to Olin Mathieson Chemical Corporation, New York, N. Y., a corporation of Virginia No Drawing. Application February 28, 1957
Serial No. 642,949

6 Claims. (Cl. 99—141)

This invention relates to saccharin compositions, and has for its object the provision of advantageous saccharin compositions in the form of highly concentrated liquid preparations capable of being dispensed dropwise for the desired degree of sweetening.

The use of saccharin powder or tablets for sweetening foods, by diabetics and others who must or should restrict their sugar intake or caloric count, is well known; however, the bitter (metallic) after-taste imparted by saccharin has remained a problem. Attempts have been made to eliminate this bitterness in specially-sweetened canned fruits and other dietetic food products by combining relatively small amounts of saccharin with sorbitol, with the ratio of saccharin to sorbitol between 1:50 and 1:400; nevertheless such a combination has been described as having a metallic taste, and furthermore a reduction in the quantity of sorbitol was deemed "undesirable." Still another expedient utilized in an attempt to eliminate the bitter after-taste imparted by the saccharin is the combining of a soluble saccharin with a sodium or calcium salt of cyclohexylsulfamic acid. Such a combination, when designed to impart maximum sweetening power without the bitter after-taste, would seem to call for approximately equal quantities of a soluble-saccharin and calcium or sodium cyclohexylsulfamate; but with such combination in the desired high concentration, crystallization occurs when the solution is cooled, say to 5° C., and the product is thereby rendered unusable.

It has been found, however, that a stable combination of a saccharin salt and a salt of cyclohexylsulfamic acid, in approximately equal quantities (by weight) and in the desired high concentrations can be effected by having magnesium as a substantial portion, up to approximately half, of the total cation of these salts, the remainder being a soluble-salt-forming cation. This provides an advantageous soluble-saccharin composition which is immediately utilizable without the possibility of undissolved particles and subsequent crystallizing out of the saccharin and/or the cyclohexylsulfamate. The resulting composition is of an especially desirable viscosity for dropwise dispensing and possesses an increased sweetening power without the bitter after-taste. Since the composition is especially adapted to being dispensed as drops on passing through a narrow orifice (employing, for example, a dropper-orifice equipped squeeze bottle), the unsatisfactory aspects of a mere (low-viscosity) saccharin solution and the difficulties of dispersing a saccharin powder or tablet are avoided. The compositions of this invention are used to advantage in hot and cold drinks, and in liquids used on fruits and cereals. It is excellent combined with other ingredients in cooking, retaining its full sweetness during boiling or baking.

The preferred liquid soluble-saccharin compositions of this invention essentially comprise at least about 10 percent by weight/volume of each of a saccharin salt and a cyclohexylsulfamic acid salt in the aqueous vehicle, with the cation thereof being in part magnesium as specified hereinbefore.

Such a liquid soluble-saccharin composition containing a total of not less than about 20 percent saccharin salt and cyclohexylsulfamic acid salt solids by weight/volume is especially advantageous. Thus, in one of the preferred embodiments of this invention, the composition comprises between about 10 and 20 percent by weight/volume of magnesium saccharin (especially, about 13 percent) and an amount of sodium cyclohexylsulfamate of the same order.

In place of magnesium saccharin one may employ other soluble saccharin salts acceptable as sweeteners, inter alia, sodium saccharin, potassium saccharin or calcium saccharin, in which case the cyclohexylsulfamate is, at least in major part, in the form of the magnesium salt. Any soluble salt of cyclohexylsulfamic acid, inter alia, the calcium salt or the sodium salt, may be employed when the saccharin is in the magnesium salt form.

The compositions of this invention may also include desirable ingredients other than a saccharin salt, a salt of cyclohexylsulfamic acid and water, inter alia: humectants (such as glycerin, propylene glycol, or polyethylene glycol); preservatives (such as a benzoate, or esters of p-hydroxy-benzoate); pharmaceutical adjuncts (such as polyvinylpyrrolidone, carboxymethylcellulose, methylcellulose or gelatin); and/or coloring agents.

The method of preparing these stable liquid sweetening compositions essentially comprises incorporating in an aqueous vehicle, a saccharin salt and a salt of cyclohexylsulfamic acid, a substantial portion, up to approximately half, of the total cation of these salts being magnesium, the remainder being a soluble salt-forming cation. Alternatively, the magnesium salt may be formed in situ, for example, by interacting magnesium hydroxide and insoluble saccharin in warm water, adding a soluble salt of cyclohexylsulfamic acid, and cooling.

The following examples are illustrative, but by no means limitative of the invention:

Example I

To 500 liters of distilled water in a tank (steam jacketed) equipped with a mechanical agitator, 234 kilograms of milk of magnesia [ca. 8.3% $Mg(OH)_2$] is added. Insoluble saccharin (126 kilograms) is added with warming (60° C.) and stirring until the turbid milky mixture becomes clarified (the insoluble magnesium hydroxide reacts with the saccharin to produce the magnesium-saccharin salt). To this mixture is added 130 kilograms of sodium cyclohexylsulfamate and the stirring is continued. Polyethylene glycol 400 (100 liters) and polyvinylpyrrolidone K–30 (1.0 kilogram) is then added to the mixture which is continuously stirred until everything is in solution. The mixture is then allowed to cool (room temperature). A sufficient quantity of distilled water is added to adjust the final volume of the mixture to 1000 liters and the resulting solution is then filtered through a filter press and recycled to clarify the composition and free it of any foreign contamination.

This composition contains about 130 parts by weight/volume of magnesium saccharin and its weight ratio is approximately the same as that of the sodium cyclohexylsulfamate. No change in the physical appearance of the composition occurs in storage, either at room temperature or refrigerated (5° C.).

Example II

Sodium saccharin (130 kilograms) is added to 500 liters of distilled water in a tank (steam jacketed) equipped with a mechanical agitator. After complete solution has been effected, 130 kilograms of magnesium cyclohexylsulfamate is added with warming (60° C.) and constant stirring. (Magnesium cyclohexylsulfamate may be obtained by passing an aqueous solution of sodium cyclohexylsulfamate thru an ion exchange bed packed with a sulfuric acid type resin such as Amberlite IR-120.) The solution of the free cyclohexylsulfamic acid is neutralized with magnesium hydroxide, evaporated to dryness and the magnesium cyclohexylsulfamate is the recrystallized product.) To the resulting mixture is added 100 liters of glycerine and 1 kilogram of carboxymthylcellulose. The mixture is then stirred until everything is in solution and then allowed to cool to room temperature. A sufficient quantity of distilled water is added to adjust the final volume of the mixture of 1000 liters and the resulting solution is then filtered through a filter press (as in Example 1) and recycled to clarify the composition and free it of any foreign contamination.

This composition contains about 130 parts by weight/volume each of sodium saccharin and magnesium cyclohexylsulfamate. No change in the physical appearance of the composition occurs in storage, either at room temperature or refrigerated (5° C.).

Other formulations which could be utilized include:

(1)

| | Percent |
|---|---|
| Magnesium saccharin | 6.5 |
| Sodium saccharin | 6.5 |
| Sodium cyclamate | 13.0 |

(2)

| | |
|---|---|
| Sodium cyclamate | 6.5 |
| Magnesium cyclamate | 6.5 |
| Sodium saccharin | 13.0 |

Such formulations are especially adapted for use by means of drop-dispensing squeeze bottle, e. g. a polyethylene squeeze bottle having an orifice of such size that 2 or 3 drops of the liquid soluble-saccharin composition is approximately equivalent in sweetening power to one teaspoonful of sugar.

The invention may be variously otherwise embodied within the scope of the appended claims.

What is claimed is:

1. A stable liquid sweetening composition essentially comprising an aqueous solution of a saccharin salt and a salt of cyclohexylsulfamic acid, a substantial portion, up to approximately half, of the total cation of these salts being magnesium, the remainder being a soluble-salt-forming cation.

2. A stable liquid sweetening composition essentially comprising an aqueous solution of a saccharin salt and a salt of cyclohexylsulfamic acid in a ratio of about 1:1 and each in a concentration of at least about 10 percent, a substantial portion, up to approximately half, of the total cation of these salts being magnesium, the remainder being a soluble-salt-forming cation.

3. A stable liquid sweetening composition essentially comprising an aqueous solution of magnesium saccharin and a salt selected from the group consisting of sodium cyclohexylsulfamate and calcium cyclohexylsulfamate, a substantial portion, up to approximately half, of these salts being the magnesium saccharin.

4. A stable liquid sweetening composition essentially comprising an aqueous solution of a saccharin salt selected from the group consisting of sodium saccharin, calcium saccharin and potassium saccharin, and magnesium cyclohexylsulfamate, a substantial portion, up to approximately half, of these salts being the magnesium cyclohexylsulfamate.

5. The method of preparing a stable liquid sweetening composition essentially comprising incorporating in an aqueous vehicle a saccharin salt and a salt of cyclohexylsulfamic acid, a substantial portion, up to approximately half, of the total cation of these salts being magnesium, the remainder being a soluble-salt-forming cation.

6. The method of preparing a stable liquid sweetening composition of which a substantial portion, up to approximately half, of the total cation of the salts of said composition are magnesium, which comprises interacting magnesium hydroxide and insoluble saccharin in warm water, adding a soluble salt of cyclohexylsulfamic acid, and cooling.

References Cited in the file of this patent

UNITED STATES PATENTS

| 2,311,235 | Kuderman | Feb. 16, 1943 |
| 2,629,665 | Gordon | Feb. 24, 1953 |
| 2,784,100 | Endicott et al. | Mar. 5, 1957 |

OTHER REFERENCES

"The Chemical Senses" by Moncrieff, Leonard Hill Limited, 17 Stratford Place, W. 1, London, 1944, pp. 257 and 274.